(12) United States Patent
Reagan et al.

(10) Patent No.: US 12,190,741 B2
(45) Date of Patent: Jan. 7, 2025

(54) CONFLICT DETECTION AND AVOIDANCE ALONG A CURRENT ROUTE OF A ROBOT

(71) Applicant: Aurora Flight Sciences Corporation, a subsidiary of The Boeing Company, Manassas, VA (US)

(72) Inventors: Margaret Reagan, Cambridge, MA (US); Jeffery Saunders, Quincy, MA (US); William R. Bosworth, Somerville, MA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 282 days.

(21) Appl. No.: 17/573,085

(22) Filed: Jan. 11, 2022

(65) Prior Publication Data

US 2022/0301440 A1    Sep. 22, 2022

Related U.S. Application Data

(60) Provisional application No. 63/155,560, filed on Mar. 2, 2021.

(51) Int. Cl.
*G08G 5/00* (2006.01)
*G08G 5/04* (2006.01)

(52) U.S. Cl.
CPC ............ *G08G 5/006* (2013.01); *G08G 5/003* (2013.01); *G08G 5/0043* (2013.01);
(Continued)

(58) Field of Classification Search
CPC ...... G08G 5/006; G08G 5/003; G08G 5/0043; G08G 5/0069; G08G 5/0086; G08G 5/045;
(Continued)

(56) References Cited

U.S. PATENT DOCUMENTS 9,262,929 B1 *   2/2016   Nick ................... G06Q 10/047
2016/0375901 A1   12/2016  Di Cairano et al.

FOREIGN PATENT DOCUMENTS

WO        2020/121215 A1      6/2020
WO    WO-2020222408 A1 *  11/2020    ............ B25J 9/1664

OTHER PUBLICATIONS

Extended European Search Report mailed Jun. 14, 2022 in the corresponding European Patent Application No. 22159604.2, 8 pages.

* cited by examiner

*Primary Examiner* — Anne Marie Antonucci
*Assistant Examiner* — Kirsten Jade M Santos
(74) *Attorney, Agent, or Firm* — Harrity & Harrity, LLP

(57) ABSTRACT

A method is provided for detecting and avoiding conflict along a current route of a robot. The method includes accessing a trajectory of the robot on the current route of the robot, and a predicted trajectory of a nearby moving object, and from the trajectory and predicted trajectory, detecting a conflict between the robot and the nearby moving object. Alternate routes for the robot are determined, each of which includes an alternative route segment offset from the current route, and a transition segment from the current route to the alternative route segment. Routes including the current and alternative routes are evaluated according to a cost metric, and a route from the routes is selected for use in at least one of guidance, navigation or control of the robot to avoid the conflict.

24 Claims, 8 Drawing Sheets

(52) U.S. Cl.
CPC ......... *G08G 5/0069* (2013.01); *G08G 5/0086* (2013.01); *G08G 5/045* (2013.01)

(58) Field of Classification Search
CPC .. G08G 5/0078; G08G 5/0008; G08G 5/0013; G08G 5/0052; G05D 1/1064; G05D 1/0214; G05D 1/0055
See application file for complete search history.

CONFLICT DETECTION AND AVOIDANCE ALONG A CURRENT ROUTE OF A ROBOT

CROSS-REFERENCE TO RELATED APPLICATION(S)

This application claims priority to U.S. Provisional Application No. 63/155,560, filed Mar. 2, 2021, entitled CONFLICT DETECTION AND AVOIDANCE ALONG A CURRENT ROUTE OF A ROBOT, the content of which is incorporated herein by reference in its entirety.

TECHNOLOGICAL FIELD

The present disclosure relates generally to robotics and, in particular, to one or more of the design, construction, operation or use of autonomous robots such as autonomous or semi-autonomous vehicles

BACKGROUND

Many modern robots and other machines are designed to operate with increased autonomy and are less reliant on well-trained operators to safely operate. Some of these modern robots are manned while others are unmanned. In particular, a variety of unmanned vehicles include unmanned ground vehicles (UGVs), unmanned aerial vehicles (UAVs), unmanned surface vehicles (USVs), unmanned underwater vehicles (UUVs), unmanned spacecraft and the like. The use of unmanned vehicles has grown in recent years and these unmanned vehicles are employed in a wide variety of applications, including both military and civilian uses.

One focus in the field of robotics is in the improvement of autonomy, which often includes multiple aspects of robot operation. These aspects of robot operation include automatic control of a given robot to support remote human control. Another aspect is optimization systems (and associated methods) to determine how, for a given robot or set of robots, tasks should be ordered and/or allocated. And yet another aspect of robot operation is automatic, real-time or near real-time data processing, and exploitation in support of automatic route planning, mission execution and other activities.

Despite advancements, existing autonomy systems are typically configured to address only one aspect of these activities, thereby focusing its design of the underling autonomy algorithms and software architecture on a narrow mission set. This limits the extensibility of existing autonomy systems. Furthermore, it is generally desirable to improve existing systems to enhance their efficiency and operation.

Therefore it would be desirable to have a system and method that takes into account at least some of the issues discussed above, as well as other possible issues.

BRIEF SUMMARY

Example implementations of the present disclosure are directed to conflict detection and avoidance along a current route of a robot. Some example implementations use alternate routes having an offset from the current route to avoid detected conflicts between the robot and any nearby moving objects. Each of these alternate routes may include an alternative route segment offset from the current route, and a transition segment from the current route to the alternative route segment.

The alternative route segment may be defined before a mission is executed, or determined from the offset during the mission, which may allow the alternative route segment to be verified to be terrain obstacle free, dynamically feasible or otherwise optimal before the mission. During the mission, then, the robot may more simply determine the transition segment. The robot may also more simply return to the current path with just the transition segment back determined, which may require less computational resources than planning an entire route back to the current route after maneuvering in a direction for a previously unknown length of time to avoid a detected conflict.

The present disclosure thus includes, without limitation, the following example implementations.

Some example implementations provide a method of detecting and avoiding conflict along a current route of a robot, the method comprising accessing a trajectory of the robot on the current route of the robot, and a predicted trajectory of a nearby moving object; detecting a conflict between the robot and the nearby moving object from a comparison of the robot and the nearby moving object on respectively the trajectory of the robot, and the predicted trajectory of the nearby moving object; determining alternate routes for the robot, each alternative route including an alternative route segment offset from the current route, and a transition segment from the current route to the alternative route segment; evaluating routes including the alternate routes according to a cost metric that depends on a time or distance to a point of approach between the nearby moving object and the robot, and a distance from the current route; and selecting a route from the routes for use in at least one of guidance, navigation or control of the robot to avoid the conflict.

In some example implementations of the method of any preceding example implementation, or any combination of any preceding example implementations, the current route of the robot is described by at least one of a route command, a flight plan or a mission route, and the method further comprises determining the trajectory of the robot using the at least one of the route command, the flight plan or the mission route.

In some example implementations of the method of any preceding example implementation, or any combination of any preceding example implementations, the alternative route segment is a predefined alternative route segment, and determining the alternate routes comprises for an alternative route accessing information that describes the predefined alternative route segment; and determining the transition segment from the current route to the predefined alternative route segment.

In some example implementations of the method of any preceding example implementation, or any combination of any preceding example implementations, the offset is a predefined geometric offset, and determining the alternate routes comprises for an alternative route accessing information that describes the predefined geometric offset; determining the alternative route segment having the predefined geometric offset; and determining the transition segment from the current route to the alternative route segment as determined.

In some example implementations of the method of any preceding example implementation, or any combination of any preceding example implementations, determining the alternate routes comprises for an alternative route determining the offset that is a function of at least one of a type of the robot, a state of the robot, or a status of the robot; determining the alternative route segment having the offset as determined; and determining the transition segment from the current route to the alternative route segment as determined.

In some example implementations of the method of any preceding example implementation, or any combination of any preceding example implementations, the cost metric further depends on at least one of terrain along the routes, or a state of an environment of the robot.

In some example implementations of the method of any preceding example implementation, or any combination of any preceding example implementations, the method further comprises causing the robot to travel the route as selected.

In some example implementations of the method of any preceding example implementation, or any combination of any preceding example implementations, the method further comprises causing the robot to travel the route that is one of the alternate routes; and causing the robot to return to the current route during travel of the robot on the one of the alternate routes.

Some example implementations provide an apparatus for detecting and avoiding conflict along a current route of a robot, the apparatus comprising a memory configured to store computer-readable program code; and processing circuitry configured to access the memory, and execute the computer-readable program code to cause the apparatus to at least perform the method of any preceding example implementation, or any combination of any preceding example implementations.

Some example implementations provide a computer-readable storage medium for detecting and avoiding conflict along a current route of a robot, the computer-readable storage medium being non-transitory and having computer-readable program code stored therein that, in response to execution by processing circuitry, causes an apparatus to at least perform the method of any preceding example implementation, or any combination of any preceding example implementations.

These and other features, aspects, and advantages of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying figures which illustrate, by way of example, the principles of some described example implementations.

BRIEF DESCRIPTION OF THE FIGURE(S)

Having thus described example implementations of the disclosure in general terms, reference will now be made to the accompanying figures, which are not necessarily drawn to scale, and wherein:

Figure 3:
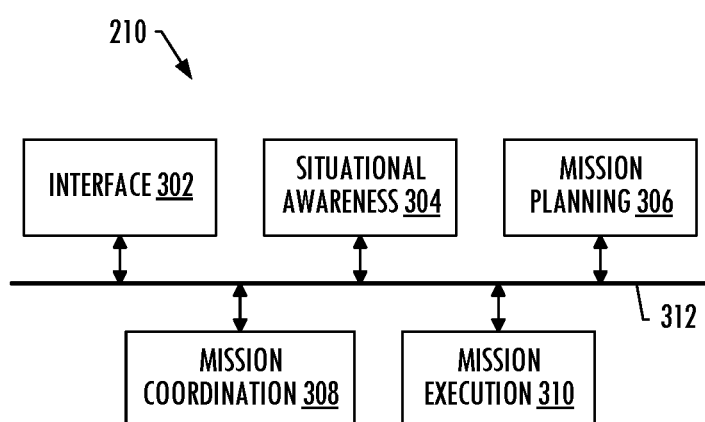
Figure 4:
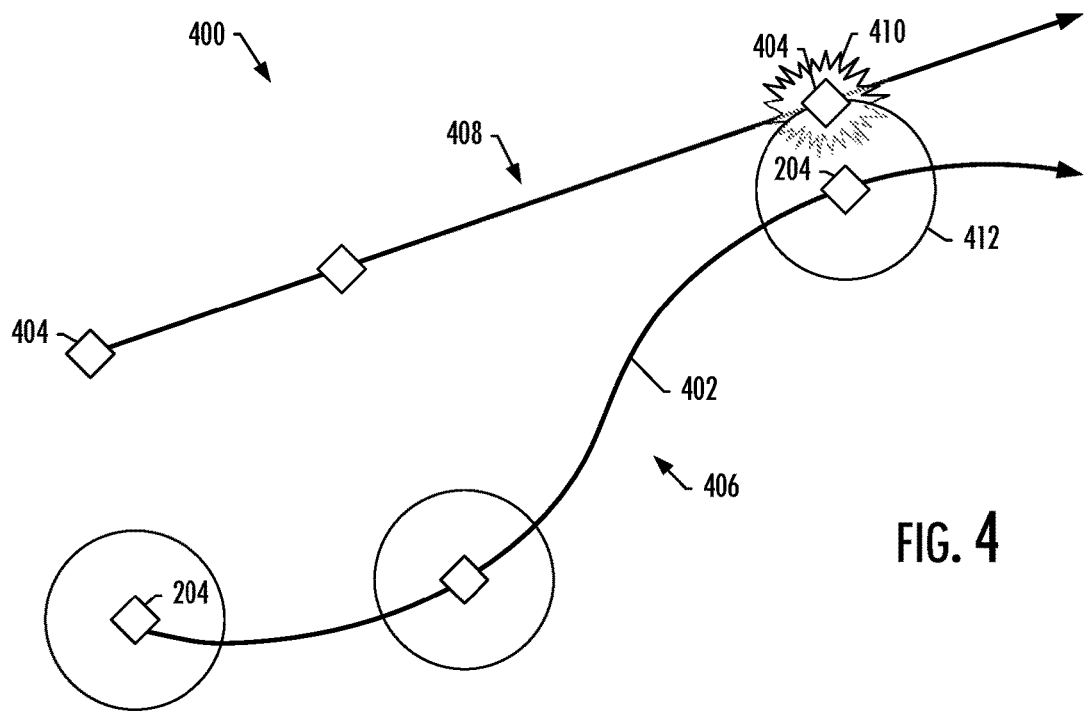
Figure 5:
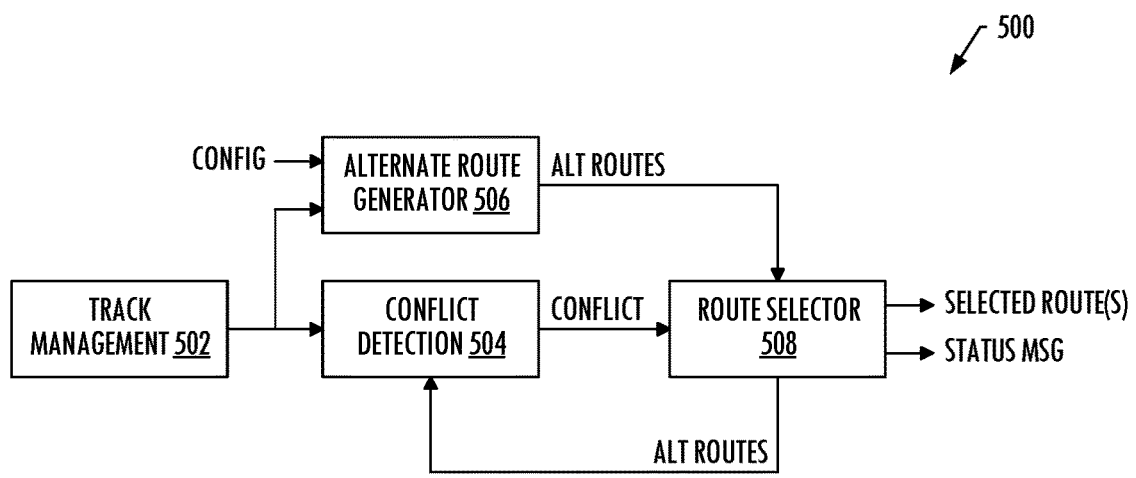
Figure 6:
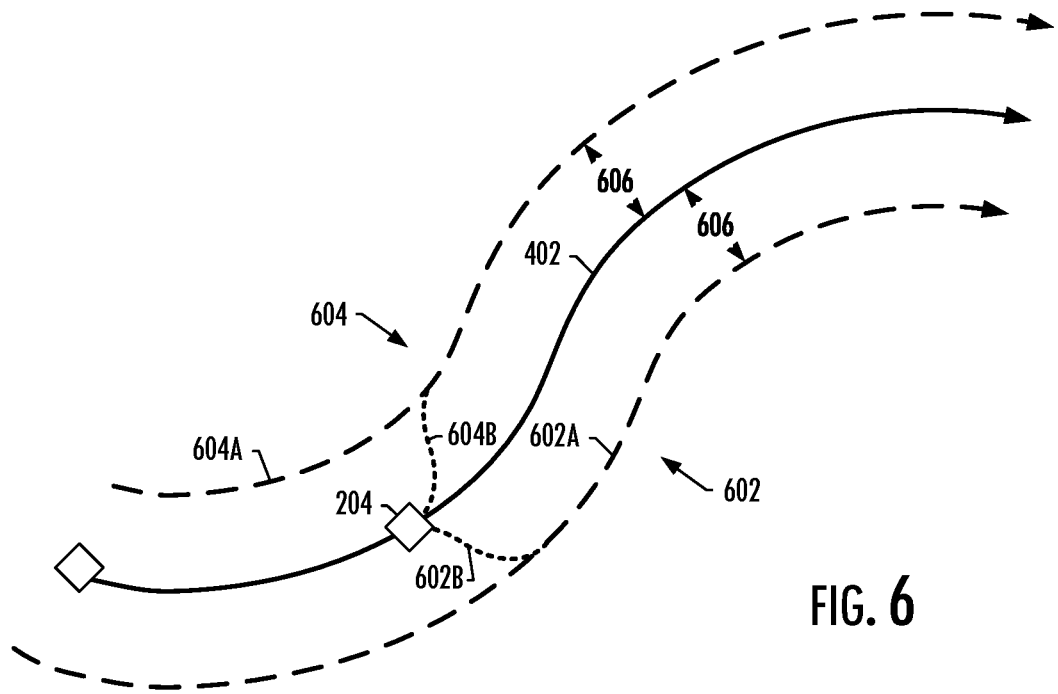
Figure 7:
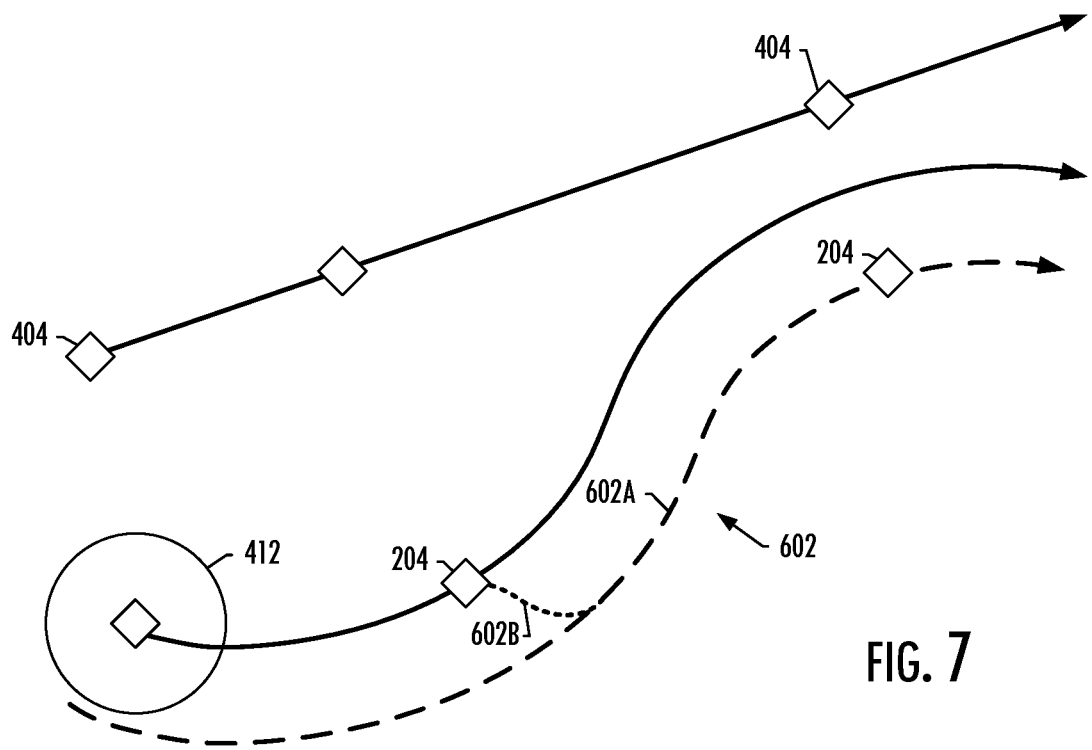
Figure 8A:
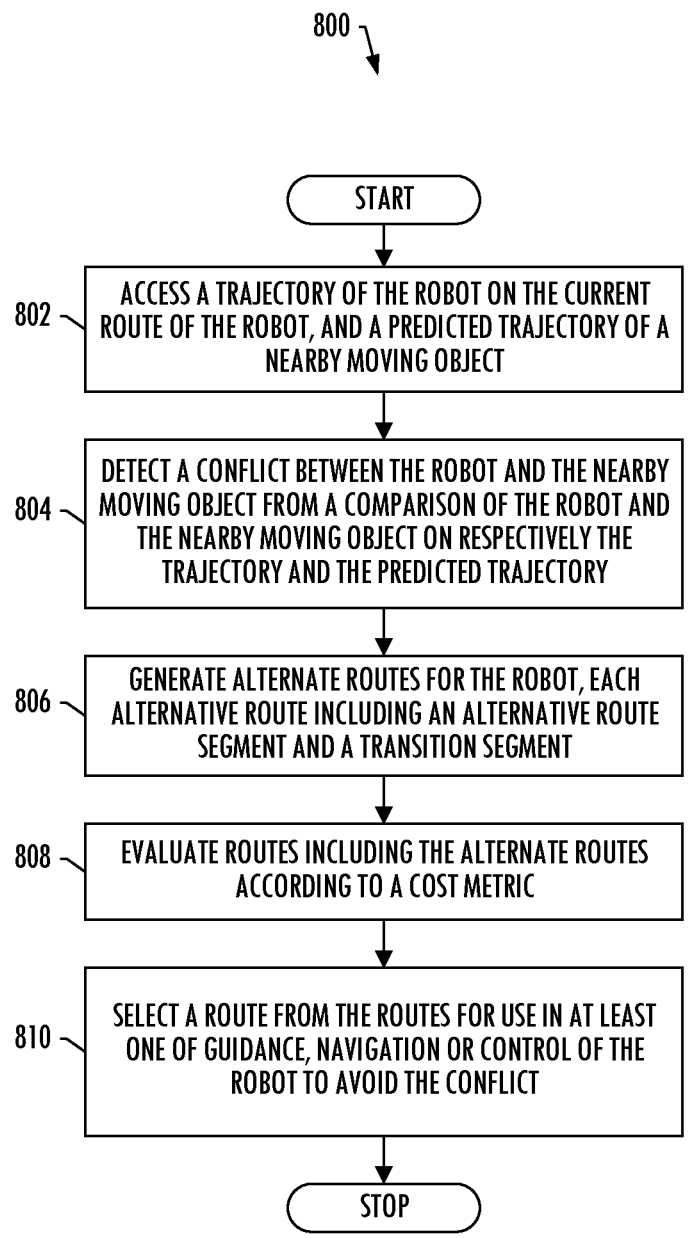
Figure 8B:
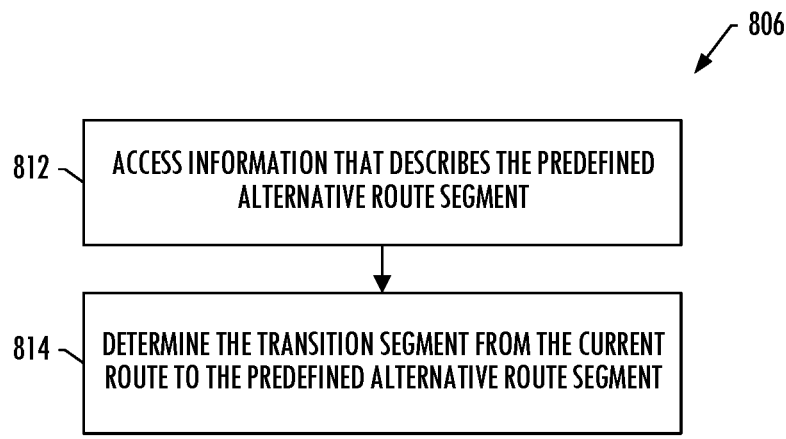
Figure 8C:
Figure 8D:
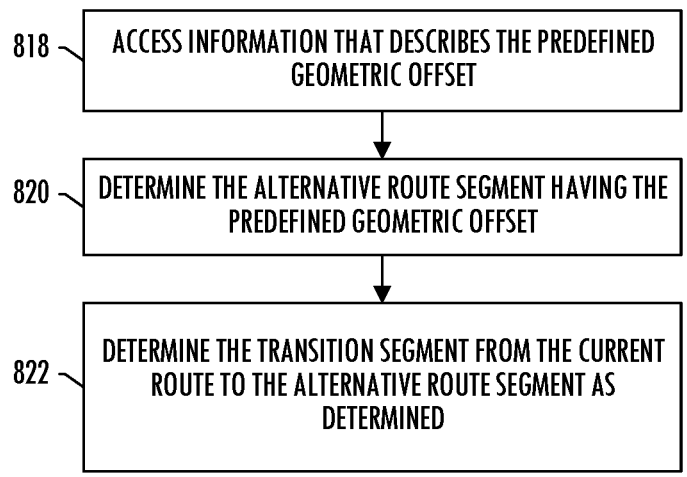
Figure 8E:
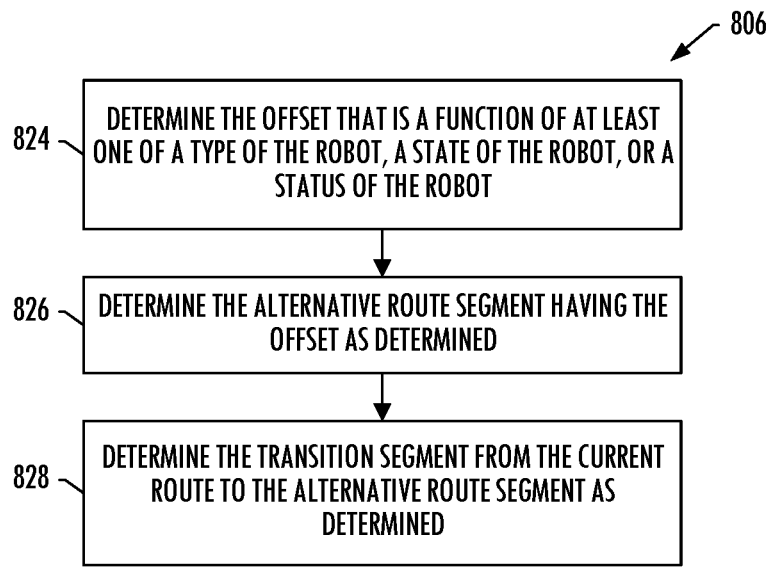
Figure 8F:
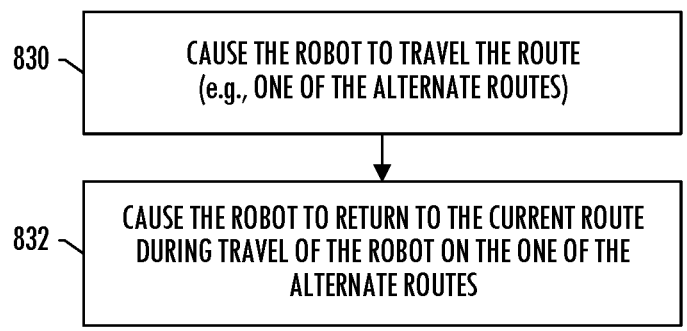
Figure 9:
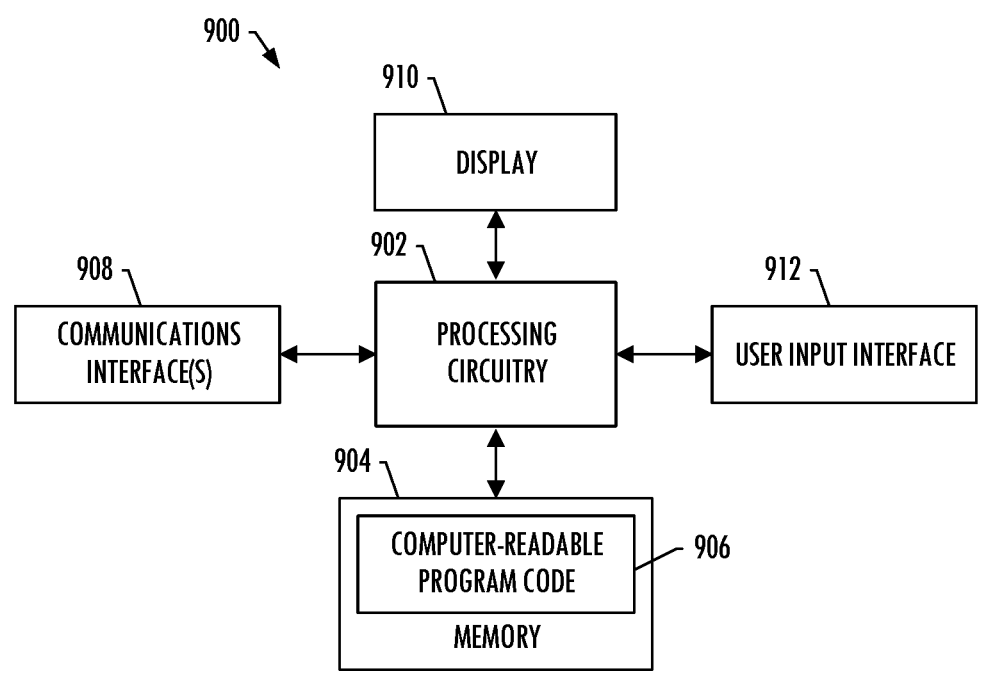

FIG. 3 more illustrates a mission management system (MMS) according to some example implementations;

FIG. 4 illustrates a scenario in which the robot is executing a mission in which the robot is to travel on a current route in an environment in which one or more moving objects are nearby the robot, according to some example implementations;

FIG. 5 is a diagram of services that may be implemented by the MMS for conflict detection and avoidance with respect to one or more nearby moving objects, according to some example implementations;

FIG. 6 illustrates routes including the current route and alternate routes that the robot may be caused to travel, according to example implementations;

FIG. 7 illustrates the current route of the robot on which a conflict is detected, and an alternate route that the robot may be caused to travel to avoid the conflict, according to example implementations;

FIGS. 8A, 8B, 8C, 8D, 8E and 8F are flowcharts illustrating various steps in a method of detecting and avoiding conflict along a current route of a robot, according to example implementations; and FIG. 9 illustrates an apparatus according to some example implementations.

DETAILED DESCRIPTION

Some implementations of the present disclosure will now be described more fully hereinafter with reference to the accompanying figures, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Like reference numerals refer to like elements throughout. Furthermore, it should be understood that unless otherwise specified, the terms "data," "content," "digital content," "information," and similar terms may be at times used interchangeably.

Example implementations of the present disclosure relate generally to robotics and, in particular, to one or more of the design, construction, operation or use of robots. As used herein, a robot is a machine designed and configurable to execute maneuvers in its environment. The robot may be manned or unmanned. The robot may be fully human-controlled, or the robot may be semi-autonomous or autonomous in which at least some of the maneuvers are executed independent of or with minimal human intervention. In some examples, the robot is operable in various modes with various amounts of human control.

A robot designed and configurable to fly may at times be referred to as an aerial robot. A robot designed and configurable to operate with at least some level of autonomy may at times be referred to as an autonomous robot, or an autonomous aerial robot in the case of an autonomous robot that is also designed and configurable to fly. Examples of suitable robots include aerobots, androids, automatons, autonomous vehicles, explosive ordnance disposal robots, hexapods, industrial robots, insect robots, microbots, nanobots, military robots, mobile robots, rovers, service robots, surgical robots, walking robots and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These may include autonomous cars, planes, trains, industrial vehicles, fulfillment center robots, supply-chain robots, robotic vehicles, mine sweepers, and the like.

Figure 1:
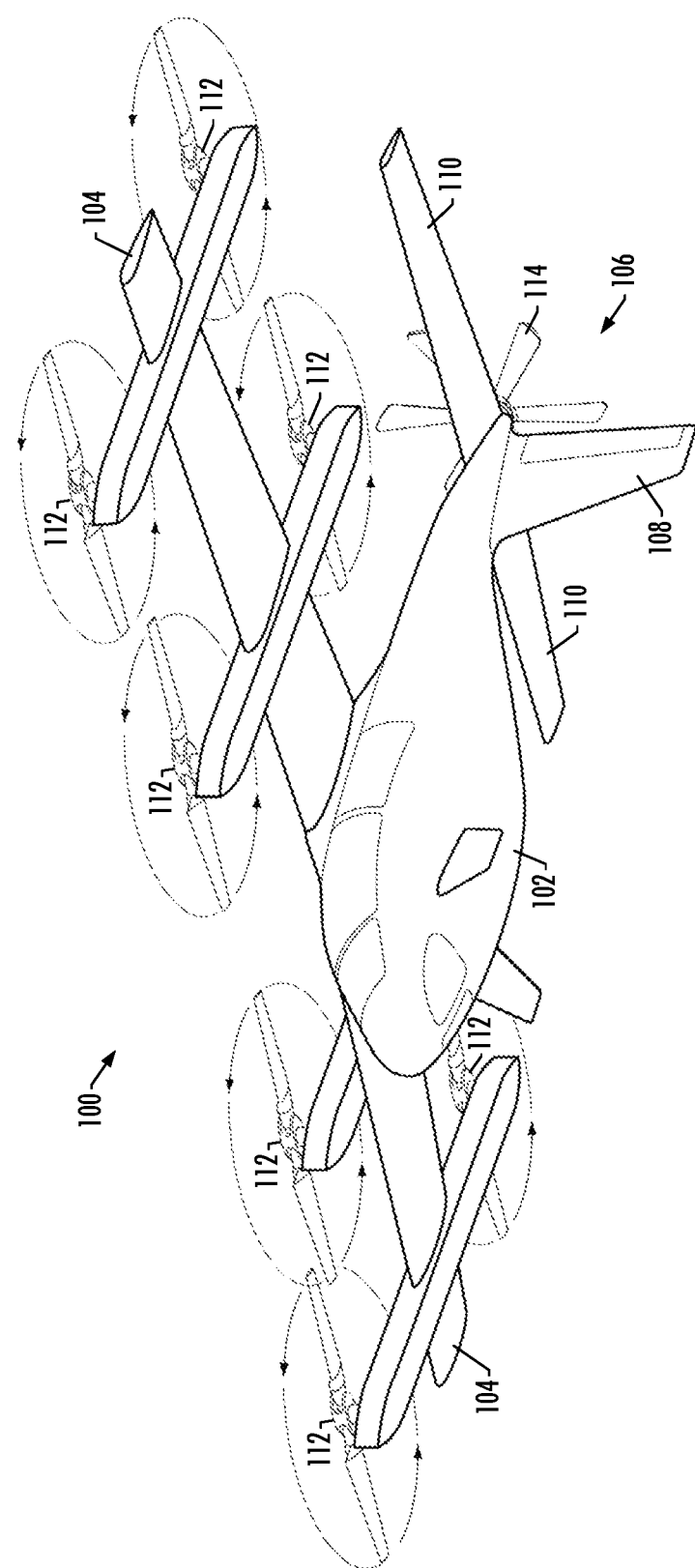
FIG. 1 illustrates one type of robot, namely, an unmanned aerial vehicle, that may benefit from example implementations of the present disclosure.

FIG. 1 illustrates one type of robot, namely, a UAV 100, that may benefit from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to respectively the wings and the end of the tail assembly for lifting and propelling the UAV during flight.

Figure 2:
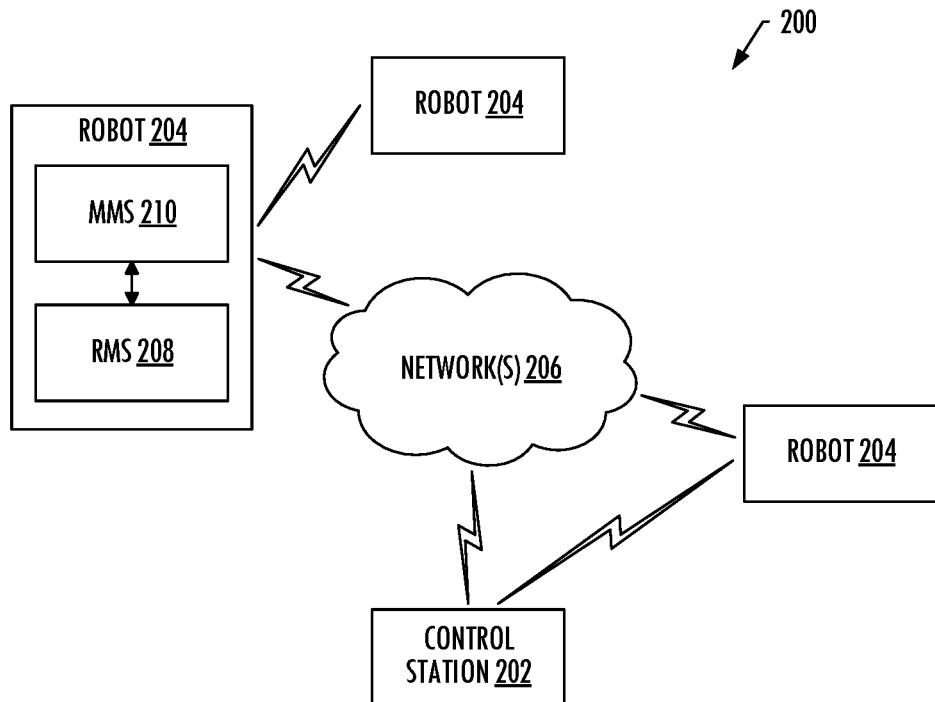
FIG. 2 illustrates a system according to some example implementations.

FIG. 2 illustrates a system 200 according to some example implementations of the present disclosure. The system may include any of a number of different subsystems (each an individual system) for performing one or more functions or operations. As shown, in some examples, the system includes a control station 202 and one or more robots 204 (e.g., one or more UAVs 100). The control station provides facilities for communication with or control of the one or more robots, such as by wired or wireless data links directly or across one or more networks 206. In some examples, the control station may be a ground station, and not in all cases control the robots. In this regard, the control station may be configured to monitor the robots. The control station may initiate mission, but the control station may not control the robots to maneuver. At times, then, the control station may enable or provide a distributed network/server of software functions.

The robot 204 includes a robot management system (RMS) 208 and a mission management system (MMS) 210. The RMS is a robot-specific subsystem configured to manage subsystems and other components of the robot. These subsystems and other components include, for example, maneuver controls, landing gear, onboard environmental systems, electrical, pneumatic and hydraulic systems, communications systems, navigation systems and other subsystems and components for controlling operation and maneuvering of the robot. The RMS is configured to accept maneuver commands such as waypoints and/or steering commands, and control the robot to follow those maneuver commands. In the context of a vehicle, the RMS is at times referred to as a vehicle management system (VMS).

The MMS 210 is a subsystem configured to manage missions of the robot 204. A mission is a deployment of the robot (one or more robots) to achieve one or more mission objectives. A mission may be decomposed into maneuvers of the robot with optional sensor and/or effector scheduling, and the MMS may execute tasks to manage the robot to execute maneuvers with specific parameters and capabilities. The MMS 210 includes subsystems to process sensor data to situational awareness, plan tasks for the robot 204 (or multiple robots), coordinate with teams to assign tasks, execute assigned tasks. The MMS is also configured to interface with the RMS 208, and in some examples the control station 202. Although the MMS is shown on the robot 204, the MMS may instead be at the control station; or in some examples, the MMS may be distributed between the robot and the control station.

In some examples, the MMS 210 provides a complete, end-to-end autonomy architecture with open system architecture standards and parameterized to allow rapid extension and reapplication to a variety of robots. The flexibility of the MMS enables an operator to code it once, but to apply it anywhere. The MMS may therefore be applied to virtually any robot that applies, or benefits from, autonomy. The MMS may include an adaptable autonomy architecture that is applicable to a variety of robots, including those identified above. A benefit of the MMS is therefore not only in the specific contents, but also in the specific details of the architecture, its subroutines, and in the interfaces between those subroutines and other systems/devices that support rapid extensibility and adaptability of the MMS to a variety of domains.

FIG. 3 more particularly illustrates the MMS 210 according to some example implementations of the present disclosure. The MMS may include any of a number of different subsystems (each an individual system) for performing one or more functions or operations. As shown, in some examples, the MMS includes an interface subsystem 302, a situational awareness subsystem 304, a mission planning subsystem 306, a mission coordination subsystem 308, and a mission execution subsystem 310. As suggested above, in some examples, the subsystems of the MMS may be on the robot 204, at the control station 202, or distributed between the robot and the control station. The subsystems may be configured to communicate with one another directly, over a communication bus 312, or across the network(s) 206 in examples in which the MMS is distributed between the robot and the control station.

The subsystems enable the MMS 210 of the robot 204 to interface with the system 200, perform situational awareness, plan a mission including a plurality of tasks, coordinate the plurality of tasks and thereby the mission with other robots 204, and execute the mission. For example, the MMS may use the interface subsystem 302 to interface with various sensors onboard the robot, the RMS 208, the control station 202 and/or other robots. The MMS may use the situational awareness subsystem 304 to acquire sensor data and maintain an awareness of the state of the environment in which the robot is operating. The MMS may use the mission planning subsystem 306 to plan a mission including or associated with a plurality of tasks, and which may incorporate rules of engagement, tactics and other constraints on operations. The MMS may likewise use the mission planning subsystem to dynamically replan a mission in which changes to the mission are made in real-time or near real-time as the mission is executed. The MMS may use the mission coordination subsystem 308 to coordinate the plurality of tasks of the mission with other robots and users, where agreed-upon tasks may then be executed by the MMS using the mission execution subsystem 310.

According to some example implementations of the present disclosure, the MMS 210 is also configured to implement software functionality or functionalities (at times referred to as services) during a mission to provide the robot 204 with conflict detection and avoidance capabilities. During a mission, the robot may take a path, and this path may be described by a series of waypoints that define a route the robot will travel. The robot travels with a velocity (speed and direction of motion), and the series of waypoints and velocities at that define the route with respect to time defines a trajectory of the robot (at times referred to as a track of the robot). The conflict detection and avoidance capabilities enable the robot to detect and avoid conflicts along its route of travel.

FIG. 4 illustrates a scenario 400 in which the robot 204 is executing a mission in which the robot is to travel on a current route 402 in an environment in which one or more moving objects 404 are nearby the robot. In some examples, these moving objects are other robots that may be of the same type or different types than the robot. Other examples of suitable moving objects include non-robot vehicles such as any of a number of different types of ground vehicles, watercraft, aircraft, spacecraft or the like.

FIG. 5 is a diagram of services 500 that may be implemented by the MMS 210 for conflict detection and avoidance with respect to nearby moving objects 404, according to some example implementations. As shown, the services may include a track management 502 service, conflict detection 504 service, alternate route generator 506 service, and a route selector 508 service. In some examples, the track management service may be implemented by the situational awareness subsystem 304 of the MMS; and the conflict detection service, alternate route generator service and route selector service may be implemented by the mission execution subsystem 310 of the MMS.

The track management 502 service is configured to determine a trajectory 406 of the robot 204 on the current route 402, such as from data that indicates a position and a velocity of the robot. The data may include state data that describes position and velocity of the robot, and which in some examples may be received from the RMS 208. In some examples, the current route for the robot is described by a route command, a flight plan (for an aerial robot) and/or a mission route; and in some of these examples, the trajectory of the robot is determined using the route command, the flight plan and/or the mission route. In this regard, the route in some examples is a planned route of the robot.

In some examples, the track management 502 service is also configured to determine a predicted trajectory 408 of nearby moving object(s) 404, such as from data that indicates a position and a velocity of the nearby moving object(s). This data may be or include sensor data from any of a number of different sensors including those employing technologies such as acoustics, radio, optics and the like. More particular examples of suitable sensors include those employing radar, lidar, infrared sensors, cameras and the like. Another example of a suitable sensor in the context of an aerial robot is an automatic, dependent surveillance-broadcast (ADS-B) receiver configured to receive ADS-B signals.

The conflict detection 504 service of the services 500 that may be implemented by the MMS 210 is configured to access the trajectory 406 of the robot 204 on the current route 402 of the robot, and the predicted trajectory 408 of the nearby moving object 404, such as from the track management 502 service. The conflict detection service is configured to detect a conflict 410 between the robot and the nearby moving object from a comparison of the robot and the nearby moving object on respectively the trajectory of the robot, and the predicted trajectory of the nearby moving object; and the conflict detection service is configured to output an indication of the conflict, which may include a time or distance to a point of approach between the nearby moving object and the robot. In some examples, the point of approach is the closest point of approach between the nearby moving object and the robot. The conflict may be detected in any of a number of different manners, such as when the nearby moving object is within a clear region 412 that includes the robot, and a time to the point of approach between nearby moving object and the robot is less than a time threshold value. The clear region in various examples may be referred to as a well-clear region, boundary, violation volume or the like.

The alternate route generator 506 service is configured to determine alternate routes for the robot. Each alternative route includes an alternative route segment offset from the current route, and a transition segment from the current route to the alternative route segment. FIG. 6 illustrates, for example, a current route 402 and alternate routes 602, 604. As shown, each alternative route includes an alternative route segment 602A, 604A that is offset 606 from the current route, and a transition segment 602B, 604B from the current route to the alternative route segment. In some examples, the offset is a geometric offset, and the alternative route segment has a geometric offset from the current route.

The alternative route segment 602A, 604A may be predefined or determined from the offset 606. Similarly, the transition segment 602B, 604B may be predefined or determined. Any one or more of the alternative route segment, the offset or the transition segment may be defined or described in configuration data accessed by or provided to the alternative route generator 506 service. The alternative route segment and thereby the offset may be the same or different across the alternative routes 602, 604. the offset may be fixed or variable. The offset may be independent of or depend on the robot 204 or type of robot, the state of the robot, and/or the status of the robot. In one particular example, the transition segment is defined as a Dubins path that connects the position of the robot on the current route 402, to a position of the robot on the alternative route segment.

In some examples, then, the alternative route segment 602A, 604A is a predefined alternative route segment. In some of these examples, for an alternative route 602, 604, the alternative route generator 506 service is configured to access information such as the configuration data that describes the predefined alternative route segment, and determine the transition segment 602B, 604B from the current route to the predefined alternative route segment.

In some examples, the offset 606 is a predefined geometric offset. In some of these examples, for an alternative route 602, 604, the alternative route generator 506 service is configured to access information such as the configuration data that describes the predefined geometric offset. The alternative route generator service is configured to determine the alternative route segment 602A, 604A having the predefined geometric offset, and determine the transition segment 602B, 604B from the current route to the alternative route segment as determined.

In some examples, for an alternative route 602, 604, the alternative route generator 506 service is configured to determine the offset 606 that is a function of at least one of a type of the robot 204, a state of the robot, or a status of the robot. In some of these examples, the alternative route generator service is configured to determine the alternative route segment 602A, 604A having the offset as determined, and determine the transition segment 602B, 604B from the current route to the alternative route segment as determined.

Returning to FIG. 5, again, the route selector 508 service is configured to receive an indication of the conflict from the conflict detection 504 service, and which may include a time or distance to a point of approach (e.g., closest point of approach) between the nearby moving object 404 and the robot 204. The route selector service may also receive the alternate routes 602, 604 for the robot from the alternate route generator 506 service. The route selector service is configured to evaluate routes including the alternate routes according to a cost metric that depends on the time or distance to the point of approach between the nearby moving object and the robot, and a distance from the current route. In some examples, the route selector service is configured to evaluate the routes further including the current route 402 according to the cost metric. In some examples, the cost metric further depends on at least one of terrain along the routes, or a state of an environment of the robot. In some examples, the route selector service may be configured to rank the routes, and cost metric may allow the route selector service to evaluate the routes with the higher ranked routes being those with a longer time or distance to the point of approach, and/or closest to the current route.

In some examples, the route selector 508 service is configured to feed the alternate routes 602, 604 for the robot 204 back to the conflict detection 504 service. In some of these examples, the conflict detection service is configured to determine respective trajectories of the robot on the alternate routes, such as from the data that indicates the position and velocity of the robot. The conflict detection service is configured to detect any conflicts between the robot and the nearby moving object from comparisons of the robot on the respective trajectories, and the nearby moving object on its predicted trajectory. The conflict detection service is configured to output an indication of any conflict, as well as the time or distance to the point of approach between the nearby moving object and the robot on the respective trajectories. And at least the time or distance to the point of approach may be used by the route selector service to determine the cost metric and from it to evaluate the routes.

The route selector 508 service is configured to select a route from the routes (alternate routes 602, 604 and perhaps also the current route 402) for use in at least one of guidance, navigation or control of the robot to avoid the conflict. The route selector service may be configured to output an indication of the route as selected. In some examples in which the routes are ranked, the route selector service may output an indication of one or more higher ranked ones of the routes. The route selector service may also output a status message with information such as the times or distances to the point of approach between the nearby moving object and the robot on the higher ranked ones of the routes.

In some examples, the MMS 210 and in particular the mission execution subsystem 310 of the MMS is configured to determine at least one maneuver to cause the robot to travel the route as selected, and the MMS is configured to cause the robot 204 to execute the at least one maneuver. In some examples in which the routes are ranked, the MMS is configured to determine at least one maneuver to cause the robot to travel a selected one of the one or more higher ranked ones of the routes 402, 602, 604. This may include the MMS configured to send one or more maneuver commands to the RMS 208 to control the robot to follow the maneuver commands and thereby execute the at least one maneuver. The MMS may therefore be configured to cause the robot to travel the route as selected. FIG. 7 illustrates the robot as before, and one of the routes, in particular alternate route 602, that the robot may be caused to travel to avoid conflict with the nearby moving object 404.

In some examples in which the robot 204 is caused to travel one of the alternate routes (e.g., alternate route 602), the mission execution subsystem 310 of the MMS 210 is further configured to cause the robot to return to the current route during travel of the robot on the one of the alternate routes. In this regard, the track management 502, conflict detection 504, alternate route generator 506 and route selector 508 services may continue as described above. The cost metric may be defined such that the current route 402 is the highest ranked one of the routes 402, 602, 604 when the conflict detection service no longer detects the conflict for the robot on the current route. The mission execution subsystem may then cause the robot to return to the current route.

Although described in the context of a nearby moving object, example implementations of the present disclosure may be equally applicable to a nearby stationary object or spatial condition such as a physical obstacle (e.g., man-made structures, terrain), weather condition, artificial threat or no-fly zone. In some of these examples, a position of the nearby stationary object or spatial condition may be accessed. A conflict between the robot and the nearby stationary object or spatial condition may be detected from a comparison of the robot on the trajectory of the robot, and the position of the nearby stationary object or spatial condition. Alternate routes may be determined, routes evaluated and a route selected in a manner the same as or similar to that described in the context of a nearby moving object. Other aspects in the context of the nearby moving object described herein may also similarly be applied in the context of a nearby stationary object or spatial condition.

FIGS. 8A, 8B, 8C, 8D, 8E and 8F are flowcharts illustrating various steps in a method 800 of detecting and avoiding conflict along a current route 402 of a robot, according to example implementations of the present disclosure. The method includes accessing a trajectory of the robot on the current route of the robot, and a predicted trajectory of a nearby moving object, as shown at block 802 of FIG. 8A. The method includes detecting a conflict between the robot and the nearby moving object from a comparison of the robot and the nearby moving object on respectively the trajectory of the robot, and the predicted trajectory of the nearby moving object, as shown at block 804.

As also shown, the method 800 includes determining alternate routes 602, 604 for the robot, each alternative route including an alternative route segment 602A, 604A offset 606 from the current route 402, and a transition segment 602B, 604B from the current route to the alternative route segment, as shown at block 806. The method includes evaluating routes including the alternate routes according to a cost metric that depends on a time or distance to a point of approach (e.g., closest point of approach) between the nearby moving object and the robot, and a distance from the current route, as shown at block 808. In some examples, the cost metric further depends on at least one of terrain along the routes, or a state of an environment of the robot. And the method includes selecting a route from the routes for use in at least one of guidance, navigation or control of the robot to avoid the conflict, as shown at block 810.

In some examples, the alternative route segment 602A, 604A is a predefined alternative route segment. In some of these examples, determining the alternate routes 602, 604 at block 806 includes for an alternative route, accessing information that describes the predefined alternative route segment, and determining the transition segment 602B, 604B from the current route 402 to the predefined alternative route segment, as shown at blocks 812 and 814 of FIG. 8B.

In some examples, the current route 402 of the robot is described by at least one of a route command, a flight plan or a mission route. In some of these examples, the method 800 further includes determining the trajectory of the robot using the at least one of the route command, the flight plan or the mission route, as shown at block 816 of FIG. 8C.

In some examples, the offset 606 is a predefined geometric offset. In some of these examples, determining the alternate routes 602, 604 at block 806 includes for an alternative route, accessing information that describes the predefined geometric offset, as shown at block 818 of FIG. 8D. The alternative route segment 602A, 604A having the predefined geometric offset is determined at block 820. And the transition segment 602B, 604B is determined from the current route 402 to the alternative route segment as determined, as shown at block 822.

In some examples, determining the alternate routes 602, 604 at block 806 includes for an alternative route determining the offset 606 that is a function of at least one of a type of the robot, a state of the robot, or a status of the robot, as shown at block 824 of FIG. 8E. Also in some of these examples, determining the alternate routes includes for the alternative route, determining the alternative route segment 602A, 604A having the offset as determined, as shown at block 826. And the transition segment 602B, 604B is determined from the current route 402 to the alternative route segment as determined, as shown at block 828.

In some examples, the method 800 further includes causing 830 the robot to travel the route as selected, as shown at block 830 of FIG. 8F. And in some further examples in which the route is one of the alternate routes 602, 604, the method further includes causing the robot to return to the current route 402 during travel of the robot on the one of the alternate routes, as shown at block 832.

According to example implementations of the present disclosure, the MMS 210 and its subsystems including the interface subsystem 302, situational awareness subsystem 304, mission planning subsystem 306, mission coordination subsystem 308 and mission execution subsystem 310 may be implemented by various means. Means for implementing the MMS and its subsystems may include hardware, alone or under direction of one or more computer programs from a computer-readable storage medium. In some examples, one or more apparatuses may be configured to function as or otherwise implement the MMS and its subsystems shown and described herein. In examples involving more than one apparatus, the respective apparatuses may be connected to or otherwise in communication with one another in a number of different manners, such as directly or indirectly via a wired or wireless network or the like.

FIG. 9 illustrates an apparatus 900 according to some example implementations of the present disclosure. Generally, an apparatus of exemplary implementations of the present disclosure may comprise, include or be embodied in one or more fixed or portable electronic devices. The apparatus may include one or more of each of a number of components such as, for example, processing circuitry 902 (e.g., processor unit) connected to a memory 904 (e.g., storage device).

The processing circuitry 902 may be composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which may be packaged as an integrated circuit or multiple interconnected integrated circuits (an integrated circuit at times more commonly referred to as a "chip"). The processing circuitry may be configured to execute computer programs, which may be stored onboard the processing circuitry or otherwise stored in the memory 904 (of the same or another apparatus).

The processing circuitry 902 may be a number of processors, a multi-core processor or some other type of processor, depending on the particular implementation. Further, the processing circuitry may be implemented using a number of heterogeneous processor systems in which a main processor is present with one or more secondary processors on a single chip. As another illustrative example, the processing circuitry may be a symmetric multi-processor system containing multiple processors of the same type. In yet another example, the processing circuitry may be embodied as or otherwise include one or more ASICs, FPGAs or the like. Thus, although the processing circuitry may be capable of executing a computer program to perform one or more functions, the processing circuitry of various examples may be capable of performing one or more functions without the aid of a computer program. In either instance, the processing circuitry may be appropriately programmed to perform functions or operations according to example implementations of the present disclosure.

The memory 904 is generally any piece of computer hardware that is capable of storing information such as, for example, data, computer programs (e.g., computer-readable program code 906) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 904, the processing circuitry 902 may also be connected to one or more interfaces for displaying, transmitting and/or receiving information. The interfaces may include a communications interface 908 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. Examples of suitable communication interfaces include a network interface controller (NIC), wireless NIC (WNIC) or the like.

The user interfaces may include a display 910 and/or one or more user input interfaces 912 (e.g., input/output unit). The display may be configured to present or otherwise display information to a user, suitable examples of which include a liquid crystal display (LCD), light-emitting diode display (LED), plasma display panel (PDP) or the like. The user input interfaces may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by processing circuitry that is thereby programmed, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processing circuitry or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, an apparatus 900 may include a processing circuitry 902 and a computer-readable storage medium or memory 904 coupled to the processing circuitry, where the processing circuitry is configured to execute computer-readable program code 906 stored in the memory. It will also be understood that one or more functions, and combinations of functions, may be implemented by special purpose hardware-based computer systems and/or processing circuitry which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated figures. Therefore, it is to be understood that the disclosure is not to be limited to the specific implementations disclosed and that modifications and other implementations are intended to be included within the scope of the appended claims. Moreover, although the foregoing description and the associated figures describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for detecting and avoiding conflict along a current route of a robot, the apparatus comprising:
   a memory configured to store computer-readable program code; and
   processing circuitry configured to access the memory, and execute the computer-readable program code to cause the apparatus to at least:
   access a trajectory of the robot on the current route of the robot, and a predicted trajectory of a nearby moving object;
   detect a conflict between the robot and the nearby moving object from a comparison of the robot on the trajectory of the robot on the current route and the nearby moving object on the predicted trajectory of the nearby moving object;
   determine alternate routes for the robot, each of the alternate routes including an alternative route segment having a predefined geometric offset from the current route such that the alternative route segment of the alternate routes is spaced apart from the current route, and a transition segment disposed between the current route and the respective alternative route segment of the alternate routes such that the transition segment connects the current route to the respective alternative route segment of the alternate routes;
   evaluate routes including the alternate routes according to a cost metric that depends on a time or distance to a point of approach between the nearby moving object and the robot, and a distance from the current route; and
   select a route from the routes for use in at least one of guidance, navigation or control of the robot to avoid the conflict;
   wherein the processing circuitry is configured to execute the computer-readable program code to cause the apparatus to further cause the robot to travel the route as selected.

2. The apparatus of claim 1, wherein the alternative route segment is a predefined alternative route segment, and the apparatus caused to determine the alternate routes includes for an alternative route, the apparatus caused to at least:

access information that describes the predefined alternative route segment; and
determine the transition segment from the current route to the predefined alternative route segment.

3. The apparatus of claim 1, wherein the current route of the robot is described by at least one of a route command, a flight plan or a mission route, and the processing circuitry is configured to execute the computer-readable program code to cause the apparatus to further determine the trajectory of the robot using the at least one of the route command, the flight plan or the mission route.

4. The apparatus of claim 1, wherein the apparatus caused to determine the alternate routes includes for an alternative route, the apparatus caused to at least:
access information that describes the predefined geometric offset;
determine the alternative route segment having the predefined geometric offset; and
determine the transition segment from the current route to the alternative route segment as determined.

5. The apparatus of claim 1, wherein the apparatus caused to determine the alternate routes includes for an alternative route, the apparatus caused to at least:
determine the offset that is a function of at least one of a type of the robot, a state of the robot, or a status of the robot;
determine the alternative route segment having the offset as determined; and
determine the transition segment from the current route to the alternative route segment as determined.

6. The apparatus of claim 1, wherein the cost metric further depends on at least one of terrain along the routes, or a state of an environment of the robot.

7. The apparatus of claim 1, wherein the processing circuitry is configured to execute the computer-readable program code to cause the apparatus to further at least:
cause the robot to travel the route that is one of the alternate routes; and
cause the robot to return to the current route during travel of the robot on the one of the alternate routes.

8. The apparatus of claim 1, wherein the robot is an aerial robot and the current route of the aerial robot is described by a flight plan.

9. The apparatus of claim 1, wherein the transition segment is further defined as a Dubins path that connects a position of the robot on the current route to a position of the robot on the respective alternative route segment of the alternate routes.

10. The apparatus of claim 1, wherein the offset is determined based on a type of the robot, a state of the robot, and/or a status of the robot.

11. A method of detecting and avoiding conflict along a current route of a robot, the method comprising:
accessing a trajectory of the robot on the current route of the robot, and a predicted trajectory of a nearby moving object;
detecting a conflict between the robot and the nearby moving object from a comparison of the robot on the trajectory of the robot on the current route and the nearby moving object on the predicted trajectory of the nearby moving object;
determining alternate routes for the robot, each of the alternate routes including an alternative route segment having a predetermined geometric offset from the current route such that the alternative route segment of the alternate routes is spaced apart from the current route, and a transition segment connects the current route to the respective alternative route segment of the alternate routes;
evaluating routes including the alternate routes according to a cost metric that depends on a time or distance to a point of approach between the nearby moving object and the robot, and a distance from the current route; and
selecting a route from the routes for use in at least one of guidance, navigation or control of the robot to avoid the conflict;
causing the robot to travel the route as selected.

12. The method of claim 11, wherein the alternative route segment is a predefined alternative route segment, and determining the alternate routes comprises for an alternative route:
accessing information that describes the predefined alternative route segment; and
determining the transition segment from the current route to the predefined alternative route segment.

13. The method of claim 11, wherein the current route of the robot is described by at least one of a route command, a flight plan or a mission route, and the method further comprises determining the trajectory of the robot using the at least one of the route command, the flight plan or the mission route.

14. The method of claim 11, wherein determining the alternate routes comprises for an alternative route:
accessing information that describes the predefined geometric offset;
determining the alternative route segment having the predefined geometric offset; and
determining the transition segment from the current route to the alternative route segment as determined.

15. The method of claim 11, wherein determining the alternate routes comprises for an alternative route:
determining the offset that is a function of at least one of a type of the robot, a state of the robot, or a status of the robot;
determining the alternative route segment having the offset as determined; and
determining the transition segment from the current route to the alternative route segment as determined.

16. The method of claim 11, wherein the cost metric further depends on at least one of terrain along the routes, or a state of an environment of the robot.

17. The method of claim 11 further comprising:
causing the robot to travel the route that is one of the alternate routes; and
causing the robot to return to the current route during travel of the robot on the one of the alternate routes.

18. A computer-readable storage medium for detecting and avoiding conflict along a current route of a robot, the computer-readable storage medium being non-transitory and having computer-readable program code stored therein that, in response to execution by processing circuitry, causes an apparatus to at least:
access a trajectory of the robot on the current route of the robot, and a predicted trajectory of a nearby moving object;
detect a conflict between the robot and the nearby moving object from a comparison of the robot on the trajectory of the robot on the current route and the nearby moving object on the predicted trajectory of the nearby moving object;
determine alternate routes for the robot, each of the alternate routes including an alternative route segment having a predefined geometric offset from the current route such that the alternative route segment of the alternate routes is spaced apart from the current route, and a transition segment disposed between the current route and the respective alternative route segment of the alternate routes such that the transition segment connects the current route to the respective alternative route segment of the alternate routes;

evaluate routes including the alternate routes according to a cost metric that depends on a time or distance to a point of approach between the nearby moving object and the robot, and a distance from the current route; and select a route from the routes for use in at least one of guidance, navigation or control of the robot to avoid the conflict;

wherein the computer-readable storage medium has further computer-readable program code stored therein that, in response to execution by the processing circuitry, causes the apparatus to further cause the robot to travel the route as selected.

19. The computer-readable storage medium of claim 18, wherein the alternative route segment is a predefined alternative route segment, and the apparatus caused to determine the alternate routes includes for an alternative route, the apparatus caused to at least:

access information that describes the predefined alternative route segment; and determine the transition segment from the current route to the predefined alternative route segment.

20. The computer-readable storage medium of claim 18, wherein the current route of the robot is described by at least one of a route command, a flight plan or a mission route, and the computer-readable storage medium has further computer-readable program code stored therein that, in response to execution by the processing circuitry, causes the apparatus to further determine the trajectory of the robot using the at least one of the route command, the flight plan or the mission route.

21. The computer-readable storage medium of claim 18, wherein the apparatus caused to determine the alternate routes includes for an alternative route, the apparatus caused to at least:

access information that describes the predefined geometric offset;

determine the alternative route segment having the predefined geometric offset; and determine the transition segment from the current route to the alternative route segment as determined.

22. The computer-readable storage medium of claim 18, wherein the apparatus caused to determine the alternate routes includes for an alternative route, the apparatus caused to at least:

determine the offset that is a function of at least one of a type of the robot, a state of the robot, or a status of the robot;

determine the alternative route segment having the offset as determined; and determine the transition segment from the current route to the alternative route segment as determined.

23. The computer-readable storage medium of claim 18, wherein the cost metric further depends on at least one of terrain along the routes, or a state of an environment of the robot.

24. The computer-readable storage medium of claim 18, wherein the computer-readable storage medium has further computer-readable program code stored therein that, in response to execution by the processing circuitry, causes the apparatus to further at least:

cause the robot to travel the route that is one of the alternate routes; and cause the robot to return to the current route during travel of the robot on the one of the alternate routes.

* * * * *